US009649595B2

(12) United States Patent
Kowada et al.

(10) Patent No.: US 9,649,595 B2
(45) Date of Patent: May 16, 2017

(54) MIXING STRUCTURE

(71) Applicant: HINO MOTORS, LTD., Tokyo (JP)

(72) Inventors: Minoru Kowada, Tokyo (JP); Hideki Endo, Tokyo (JP); Koji Maruyama, Tokyo (JP); Tetsuichi Kominami, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 169 days.

(21) Appl. No.: 14/376,750

(22) PCT Filed: Apr. 8, 2013

(86) PCT No.: PCT/JP2013/002389
§ 371 (c)(1),
(2) Date: Aug. 5, 2014

(87) PCT Pub. No.: WO2013/153797
PCT Pub. Date: Oct. 17, 2013

(65) Prior Publication Data
US 2015/0041996 A1    Feb. 12, 2015

(30) Foreign Application Priority Data

Apr. 12, 2012  (JP) .................................. 2012-090978

(51) Int. Cl.
*B01F 3/04*    (2006.01)
*F01N 3/00*    (2006.01)
(Continued)

(52) U.S. Cl.
CPC .......... *B01D 53/94* (2013.01); *B01F 3/04021* (2013.01); *B01F 15/0227* (2013.01);
(Continued)

(58) Field of Classification Search
CPC .... B01F 3/04; B01F 3/04007; B01F 3/04021; F01N 3/00; F01N 3/20; F01N 3/206
(Continued)

(56) References Cited

U.S. PATENT DOCUMENTS 7,971,428 B2 *  7/2011  Kimura .................. F01N 3/0814
60/286
2009/0158717 A1   6/2009  Kimura et al.
(Continued)

FOREIGN PATENT DOCUMENTS

EP  1 612 383   1/2006
JP  2003-49640 A  2/2003
(Continued)

OTHER PUBLICATIONS

International Search Report Issued May 7, 2013 in PCT/JP13/002389 Filed Apr. 8, 2013.
(Continued)

*Primary Examiner* — Robert A Hopkins
(74) *Attorney, Agent, or Firm* — Oblon, McClelland, Maier & Neustadt, L.L.P.

(57) ABSTRACT

In a mixing structure with an injector 3 arranged 2 immediately after a bend 1a of an exhaust pipe 1, urea water 5 being injected by the injector 3 into the exhaust pipe 1 for mixing, a pipe diameter $D_p$ downstream of the bend 1a of the exhaust pipe 1 is large relative to a pipe diameter $D_e$ upstream of the bend.

10 Claims, 7 Drawing Sheets

(51) Int. Cl.
  *B01D 53/94* (2006.01)
  *F01N 3/20* (2006.01)
  *F01N 13/08* (2010.01)
  *F01N 3/28* (2006.01)
  *B01F 15/02* (2006.01)

(52) U.S. Cl.
  CPC .............. *F01N 3/20* (2013.01); *F01N 3/206* (2013.01); *F01N 3/2066* (2013.01); *F01N 3/2892* (2013.01); *F01N 13/08* (2013.01); *B01D 2255/65* (2013.01); *F01N 2240/20* (2013.01); *F01N 2470/20* (2013.01); *F01N 2610/02* (2013.01); *F01N 2610/14* (2013.01); *Y02T 10/24* (2013.01)

(58) Field of Classification Search
  USPC ................ 261/76, 78.2; 60/295, 301, 286

See application file for complete search history.

(56) References Cited

U.S. PATENT DOCUMENTS

2011/0079003 A1* 4/2011 Sun ................. F01N 3/2066
  60/310
2011/0214416 A1 9/2011 Kowada et al.

FOREIGN PATENT DOCUMENTS

| | | |
|---|---|---|
| JP | 2006 17018 | 1/2006 |
| JP | 2006-329019 A | 12/2006 |
| JP | 2008 151039 | 7/2008 |
| JP | 2009 68415 | 4/2009 |
| JP | 2009-156070 | 7/2009 |
| JP | 2010-31779 A | 2/2010 |
| JP | 2010 203248 | 9/2010 |
| JP | 2010-248955 A | 11/2010 |
| JP | 2012 021505 | 2/2012 |
| WO | WO 2012/008570 A1 | 1/2012 |
| WO | WO 2012/044233 A1 | 4/2012 |

OTHER PUBLICATIONS

Extended European Search Report issued Feb. 3, 2016 in Patent Application No. 13775517.9.

* cited by examiner

MIXING STRUCTURE

TECHNICAL FIELD

The present invention relates to a mixing structure for mixing urea water, which is added as a reducing agent upstream of a selective reduction catalyst for reduction and depuration of $NO_x$, with exhaust gas.

BACKGROUND ART

Conventionally, some diesel engines have a selective reduction catalyst incorporated in an exhaust pipe for flow of exhaust gas, said catalyst having a property of selectively reacting $NO_x$ with a reducing agent even in the presence of oxygen. A required amount of reducing agent is added upstream of the selective reduction catalyst and is reacted on the catalyst with $NO_x$ (nitrogen oxides) in the exhaust gas to thereby reduce a concentration of $NO_x$ discharged.

Effectiveness of ammonia ($NH_3$) used as a reducing agent for reduction and depuration of $NO_x$ is well known in a field of a plant or the like with industrial flue gas denitration. However, in a field of automobile where safety is hard to assure as to running with ammonia itself being loaded, proposed is use of nontoxic urea water as a reducing agent.

More specifically, the urea water, which is added into the exhaust gas upstream of the selective reduction catalyst, is hydrolyzed in the exhaust gas into ammonia and carbon dioxide gas according to a following equation to thereby satisfactorily reduce and depurate $NO_x$ in the exhaust gas with the ammonia on the catalyst.

$$(NH_2)_2CO + H_2O \rightarrow 2NH_3 + CO_2 \quad \text{[Equation 1]}$$

Shown in FIG. 1 is an example of conventional art for addition of urea water into exhaust gas upstream of a selective reduction catalyst. In the example illustrated, an outer periphery of an exhaust pipe 1 is formed with a bulge portion 2 protruding obliquely upstream. Attached upstream of the bulge portion 2 is an injector 3 directed obliquely downstream to approach an inside of the exhaust pipe 1 so as to add urea water 5 while the injector 3 is protected from being directly exposed to the flow of the hot exhaust gas 4.

Arranged in the exhaust pipe 1 immediately after the bulge portion 2 is a mixer 6 constituted by thin grate plates with planar surfaces in a direction of the flow of the exhaust gas 4 such that the urea water 5, which is sprayed from the injector 3 to the mixer 6 having been exposed to and elevated in temperature by the flow of the exhaust gas 4, is atomized and heated for facilitated conversion into ammonia.

There is, for example, the following Patent Literature 1 as conventional art document concerning this kind of mixing structure.

CITATION LIST

Patent Literature

[Patent Literature 1] JP 2010-203248A

SUMMARY OF INVENTION

Technical Problems

However, in order to compactly lay out a relatively large-volume selective reduction catalyst in a limited configuration space while preventing interference with peripheral devices and structures, there may be a case where an injector 3 has to be arranged immediately after the bend 1a of the exhaust pipe 1. In such case, there may occur a problem that exhaust gas 4 passes the bend 1a in a biased manner toward outward of the bending direction and the urea water 5 is urged by influence of such biased flow of the exhaust gas 4 to form a flow along an inside wall of the exhaust pipe 1, failing in satisfactory dispersion of the urea water 5. Resultant failure in uniform spraying of the urea water 5 to the mixer 6 may bring about lowered efficiency of conversion into ammonia as well as adhesion of the urea water 5 not converted into ammonia and any substances produced in a course of the conversion onto the inside wall of the exhaust pipe 1, leading to precipitation of substances derived from the urea water 5 and material corrosion due to highly corrosive intermediate products produced.

The above-mentioned biased flow of the exhaust gas 4 may be rectified if ensured is adequate length of a distance L from the bend 1a of the exhaust pipe 1 to an added position of the urea water 5 from the injector 3, which may, however, bring about a preposterous result that difficulty in compactly laying out the selective reduction catalyst leads to deteriorated mountability.

More specifically, in order to obtain enough reaction time of the urea water 5, a distance from the added position of the urea water 5 from the injector 3 to a downstream selective reduction catalyst must be lengthened to an extent possible; however, to take such step or countermeasure becomes difficult when lengthened is the distance L from the bend 1a of the exhaust pipe 1 to the added position of the urea water 5 from the injector 3.

The invention was made in view of the above and has its object to provide a mixing structure capable of satisfactorily dispersing urea water even if an injector is arranged immediately after a bend of an exhaust pipe.

Solution to Problems

The invention is directed to a mixing structure with an injector arranged immediately after a bend of an exhaust pipe, urea water being injected by said injector into said exhaust pipe for mixing, characterized in that a pipe diameter of the exhaust pipe downstream of said bend is large relative to a pipe diameter of the exhaust pipe upstream.

Thus, in this manner, the exhaust gas flowing through the exhaust pipe with the relatively small pipe diameter passes the bend and enters into the exhaust pipe with the relatively large pipe diameter, which lowers a flow velocity, dulls influence of the biased flow toward outward of the bending direction in the bend of said exhaust pipe, makes it unlikely to form the flow of the urea water along an inside wall of the exhaust pipe due to influence of the biased flow of the exhaust gas, and facilitates dispersion of the urea water injected from the injector into the exhaust gas.

Further, in the invention, an outward portion of the bend in the bending direction may be formed with a depression which suppresses any flow of the exhaust gas toward outward of the bending direction to remedy any biased flow velocity distribution. By this, said depression suppresses the flow of the exhaust gas passing the bend of the exhaust pipe toward outward of the bending direction, guides the flow of the exhaust gas toward centrally of the exhaust pipe, so that a tendency of the exhaust gas flowing biasedly and in relatively much amount toward outward of the bending direction is remedied to rectify any biased flow distribution of the exhaust gas.

As a result, it becomes further unlikely to form the flow of the urea water along the inside wall of the exhaust pipe due to influence by the biased flow of the exhaust gas, thereby facilitating dispersion of the urea water injected by the injector into the exhaust gas.

Alternatively, in the invention, a baffle plate may be arranged in the bend to suppress any flow of the exhaust gas toward outward of the bending direction to remedy any biased flow velocity distribution. By this, said baffle plate forces part of the flow of the exhaust gas passing the bend of the exhaust pipe, which is toward outward of the bending direction, to flow toward centrally of the exhaust pipe so that the tendency of the exhaust gas flowing biasedly and in relatively much amount toward outward of the bending direction is remedied to rectify any biased flow distribution of the exhaust gas.

As a result, it becomes further unlikely to form the flow of the urea water along the inside wall of the exhaust pipe due to influence by the biased flow of the exhaust gas, thereby facilitating dispersion of the urea water injected by the injector into the exhaust gas.

Advantageous Effects of Invention

A mixing structure of the invention mentioned in the above has excellent effects that the urea water can be satisfactorily dispersed even if the injector is arranged immediately after the bend of the exhaust pipe to thereby improve efficiency of conversion of the urea water into ammonia while substantially suppressing adhesion of the urea water not converted into ammonia and any substances produced in the course of the conversion onto the inside wall of the exhaust pipe and resultant precipitation of substances derived from the urea water and material corrosion due to highly corrosive intermediate products produced.

DESCRIPTION OF EMBODIMENTS

Next, embodiments of the invention will be described in conjunction with the drawings.

Figure 1:
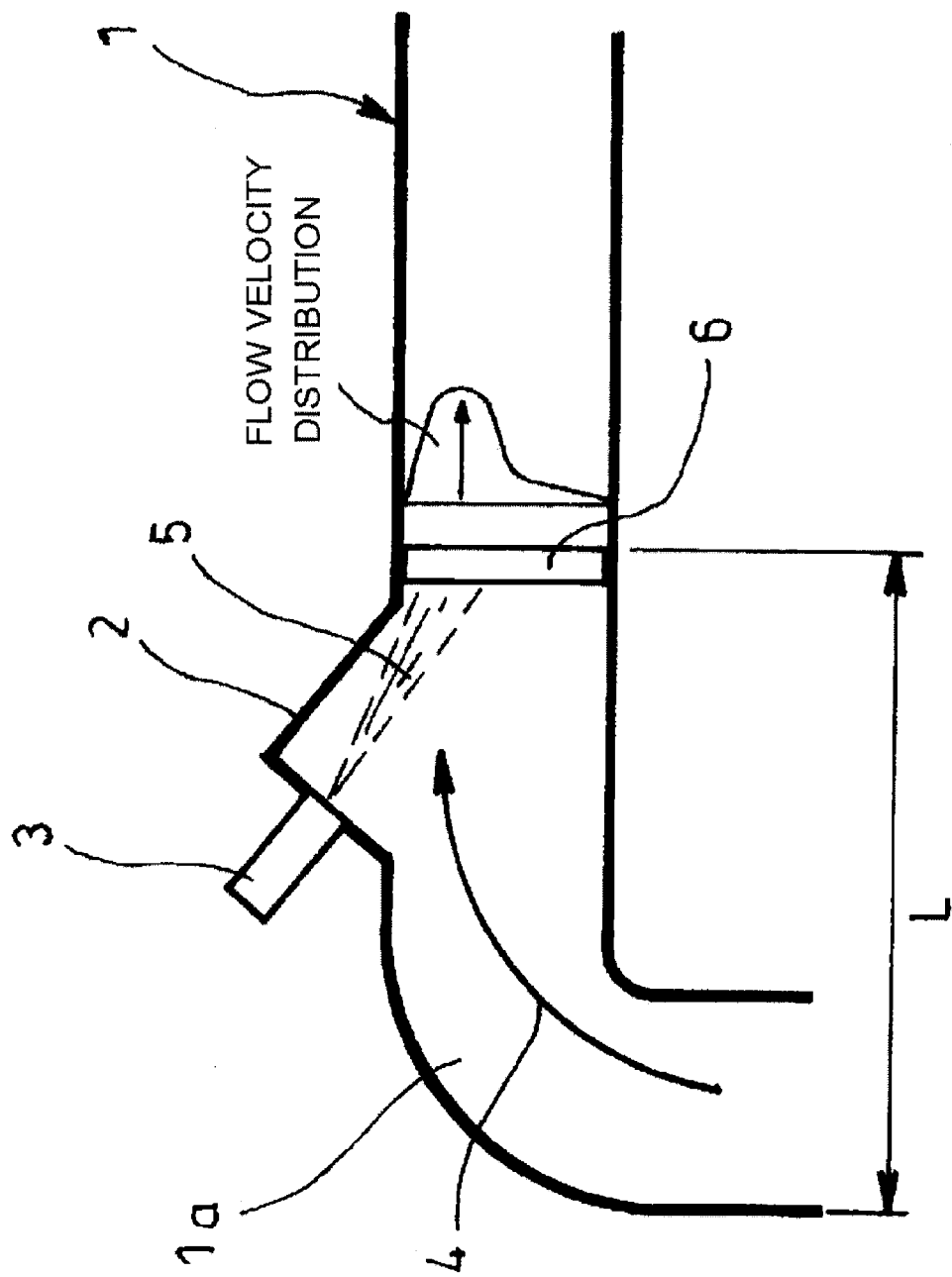
FIG. 1 is a schematic view showing a conventional structure.
Figure 2:
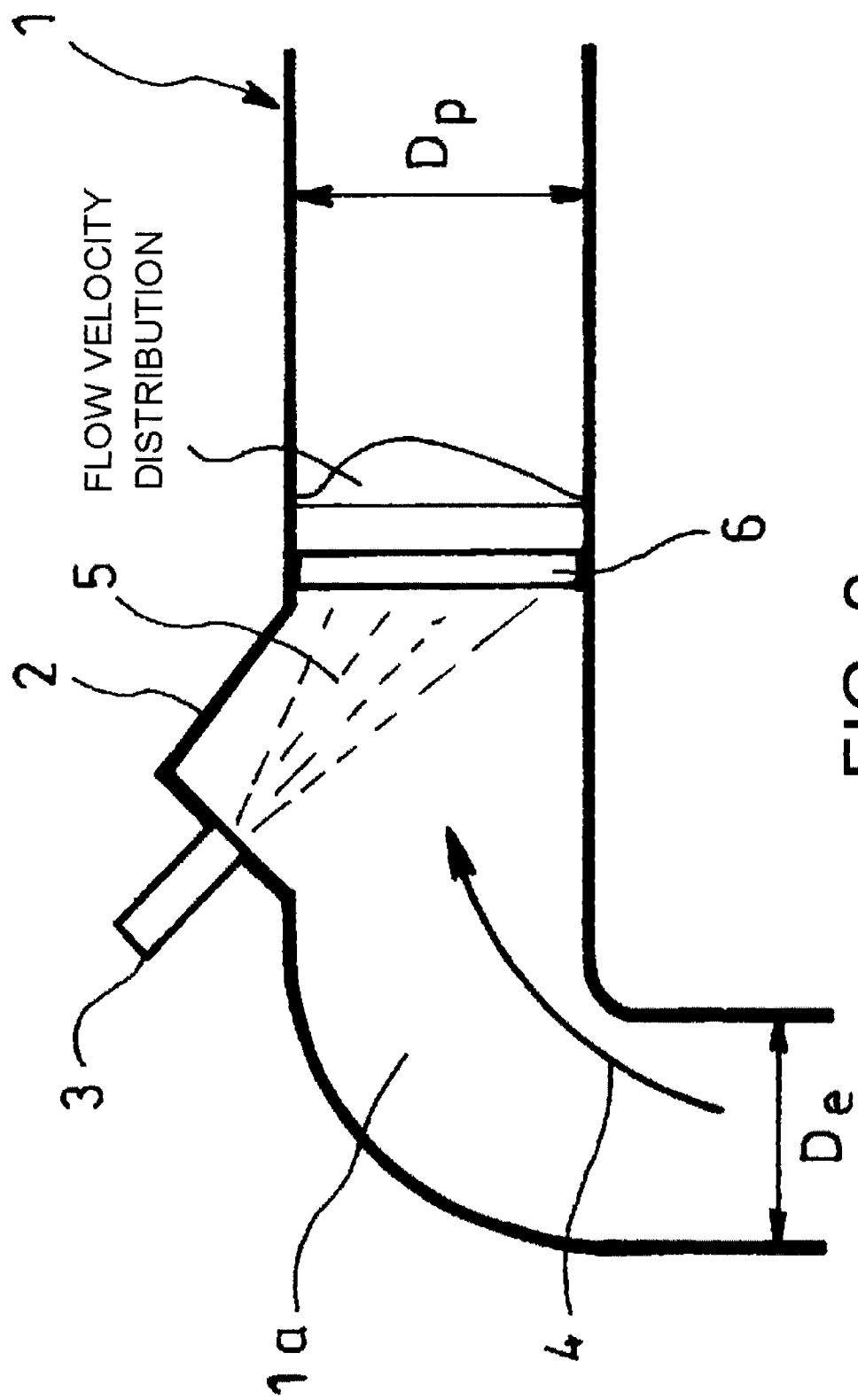
FIG. 2 is a schematic view showing a first embodiment of the invention.

FIG. 2 shows a first embodiment of the invention. In the embodiment illustrated, similarly to the above-mentioned conventional example shown in FIG. 1, an outer periphery of an exhaust pipe 1 immediately after the bend 1a thereof is formed with a bulge portion 2 protruding obliquely upstream. Attached upstream of the bulge portion 2 is an injector 3 directed obliquely downstream to approach an inside of the exhaust pipe 1 so as to add urea water 5 while the injector 3 is protected from being directly exposed to the flow of the hot exhaust gas 4. Arranged in the exhaust pipe 1 immediately after the bulge portion 2 is a mixer 6 constituted by thin grate plates with planar surfaces in a direction of the flow of the exhaust gas 4. A pipe diameter $D_p$ of the exhaust pipe 1 downstream of the bend 1a is large relative to a pipe diameter $D_e$ of the exhaust pipe 1 upstream.

Thus, in this manner, the exhaust gas 4 flowing through the exhaust pipe 1 with relatively small pipe diameter passes the bend 1a and enters into the exhaust pipe 1 with relatively large pipe diameter, which lowers a flow velocity, dulls influence of biased flow toward outward of the bending direction in the bend 1a of the exhaust pipe 1, makes it unlikely to form the flow of the urea water 5 along the inside wall of the exhaust pipe 1 due to influence of the biased flow of the exhaust gas 4, and facilitates dispersion of the urea water 5 injected from the injector 3 into the exhaust gas 4.

Thus, according to the above embodiment, even if the injector 3 is arranged immediately after the bend 1a of the exhaust pipe 1, the urea water 5 can be satisfactorily dispersed and can be uniformly sprayed to the mixer 6 to thereby improve efficiency of conversion into ammonia while substantially suppressing adhesion of the urea water 5 not converted into ammonia and any substances produced in the course of the conversion onto the inside wall of the exhaust pipe 1 and resultant precipitation of substances derived from the urea water 5 and material corrosion due to highly corrosive intermediate products produced.

Figure 3:
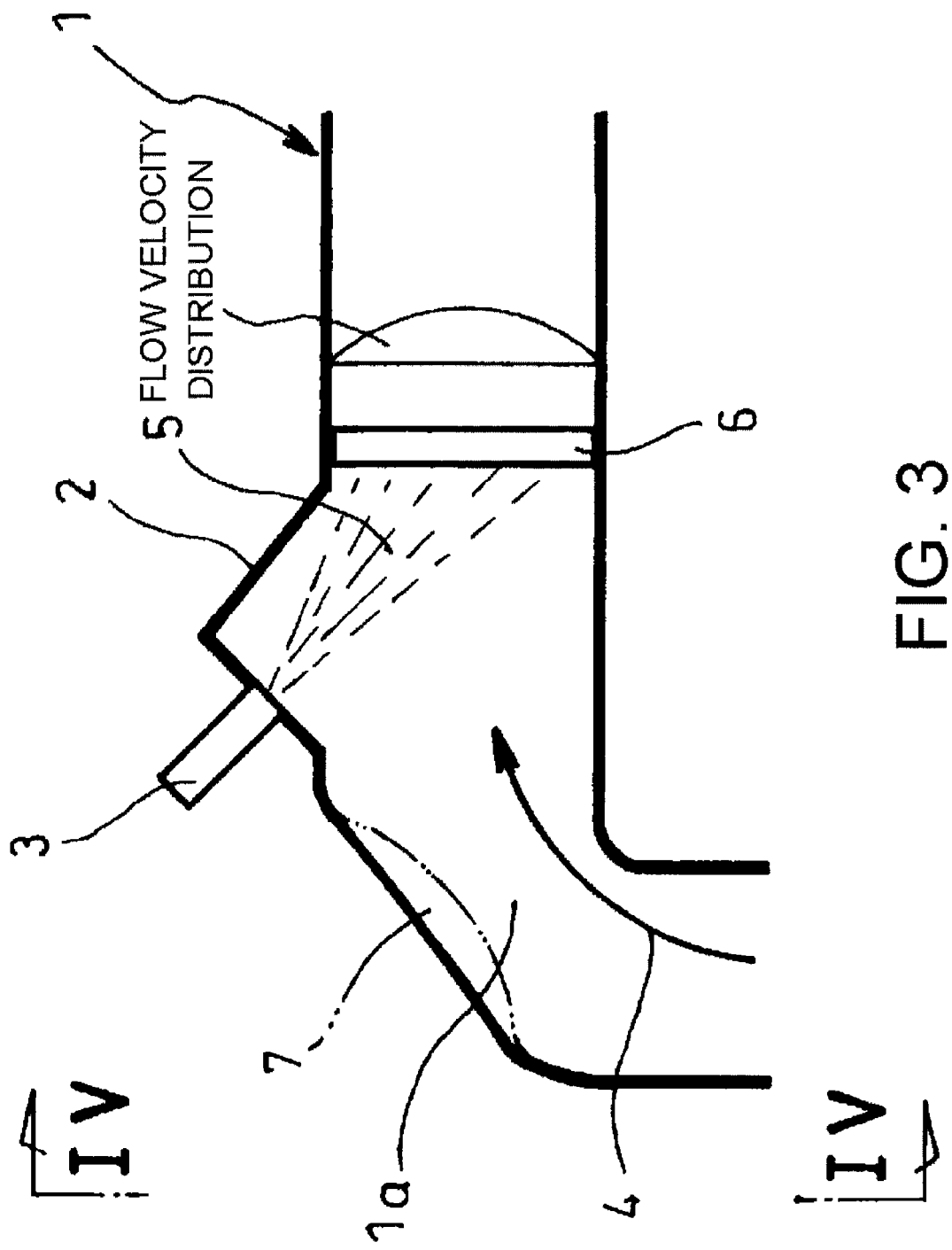
FIG. 3 is a schematic view showing a second embodiment of the invention.
Figure 4:
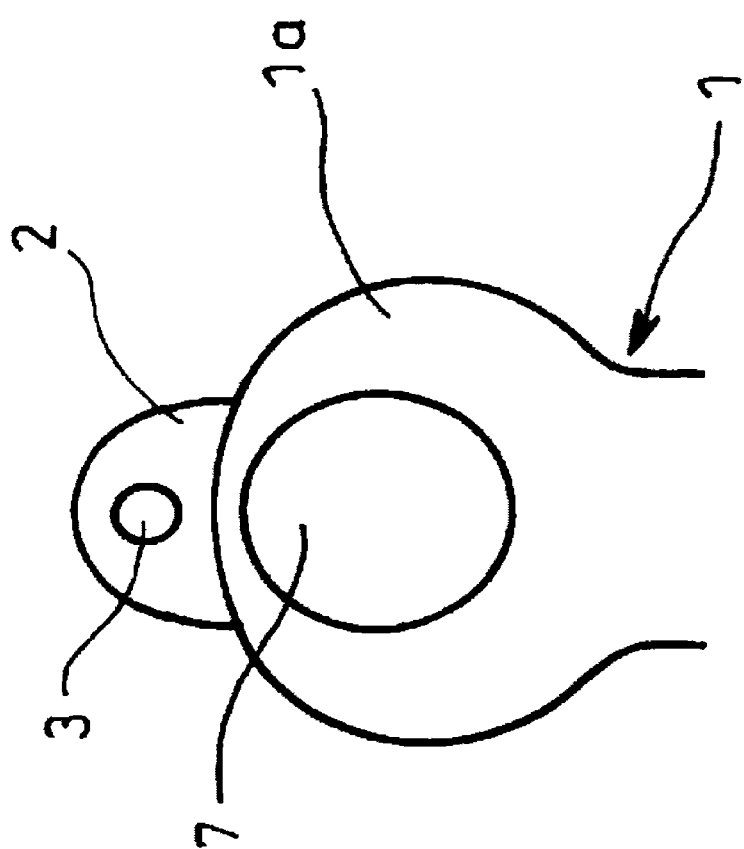
FIG. 4 is a view looking in a direction of arrows IV in FIG. 3.

FIGS. 3 and 4 show a second embodiment of the invention in which a depression 7 is added on an outward portion of the bend 1a in the bending direction so as to suppress any flow of the exhaust gas 4 toward outward of the bending direction and rectify any biased flow velocity distribution. Especially in FIG. 3 embodiment, the depression 7 is formed which provides a concavely curved portion on the outward portion of the bend 1a in the bending direction.

In this manner, the depression 7 suppresses any flow of the exhaust gas 4 passing the bend 1a of the exhaust pipe 1 toward outward of the bending direction and guides the flow of the exhaust gas 4 toward centrally of the exhaust pipe 1, so that the tendency of the exhaust gas 4 flowing biasedly and in relatively much amount toward outward of the bending direction is remedied to rectify any biased flow distribution of the exhaust gas 4.

Figure 5:
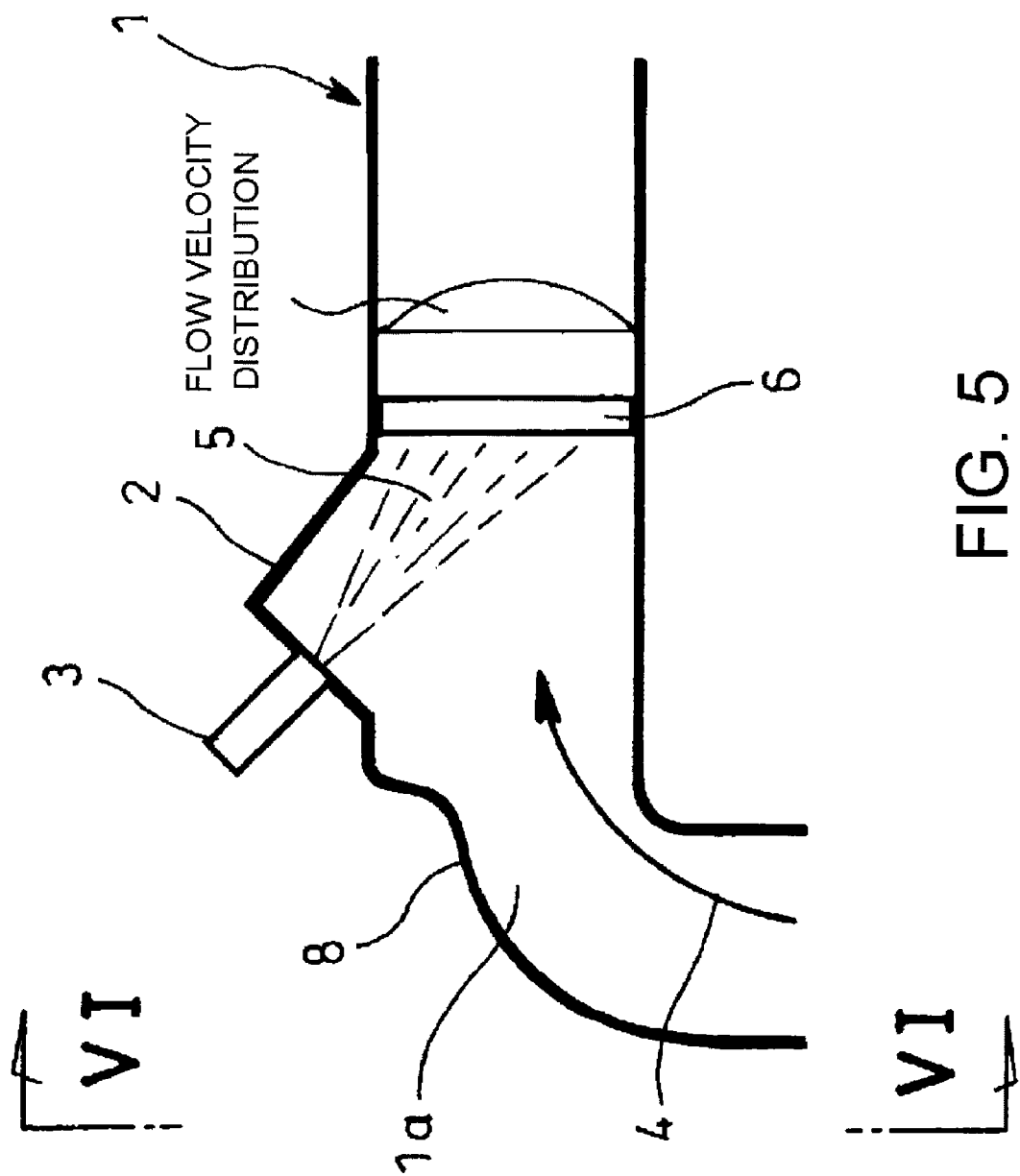
FIG. 5 is a schematic view showing a third embodiment of the invention.
Figure 6:
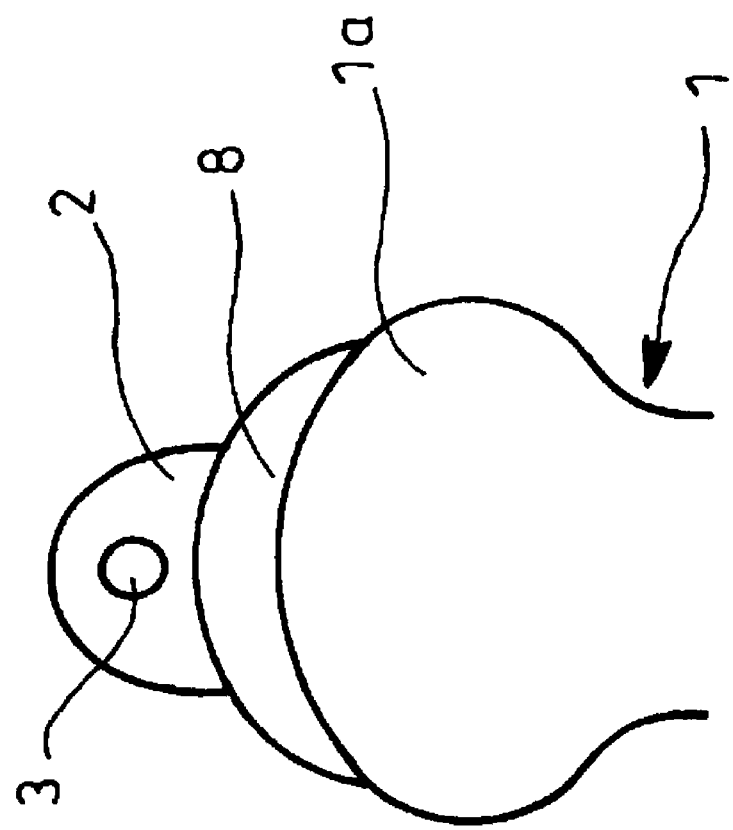
FIG. 6 is a view looking in a direction of arrows VI in FIG. 5.

Further, FIGS. 5 and 6 show a third embodiment of the invention in which the depression 7 providing the concavely curved portion in the previous second embodiment (see FIGS. 3 and 4) is replaced by a depression 8 provided by crashing the outward portion of the bend 1a in the bending direction into wholly flattened oval. Also in this case, the depression 8 suppresses any flow of the exhaust gas 4 passing the bend 1a of the exhaust pipe 1 toward outward of the bend 1a of the exhaust pipe 1 and guides the flow of the exhaust gas 4 toward centrally of the exhaust pipe 1, so that the tendency of the exhaust gas 4 flowing biasedly and in relatively much amount toward outward of the bending direction is remedied to rectify any biased flow distribution of exhaust gas 4.

Figure 7:
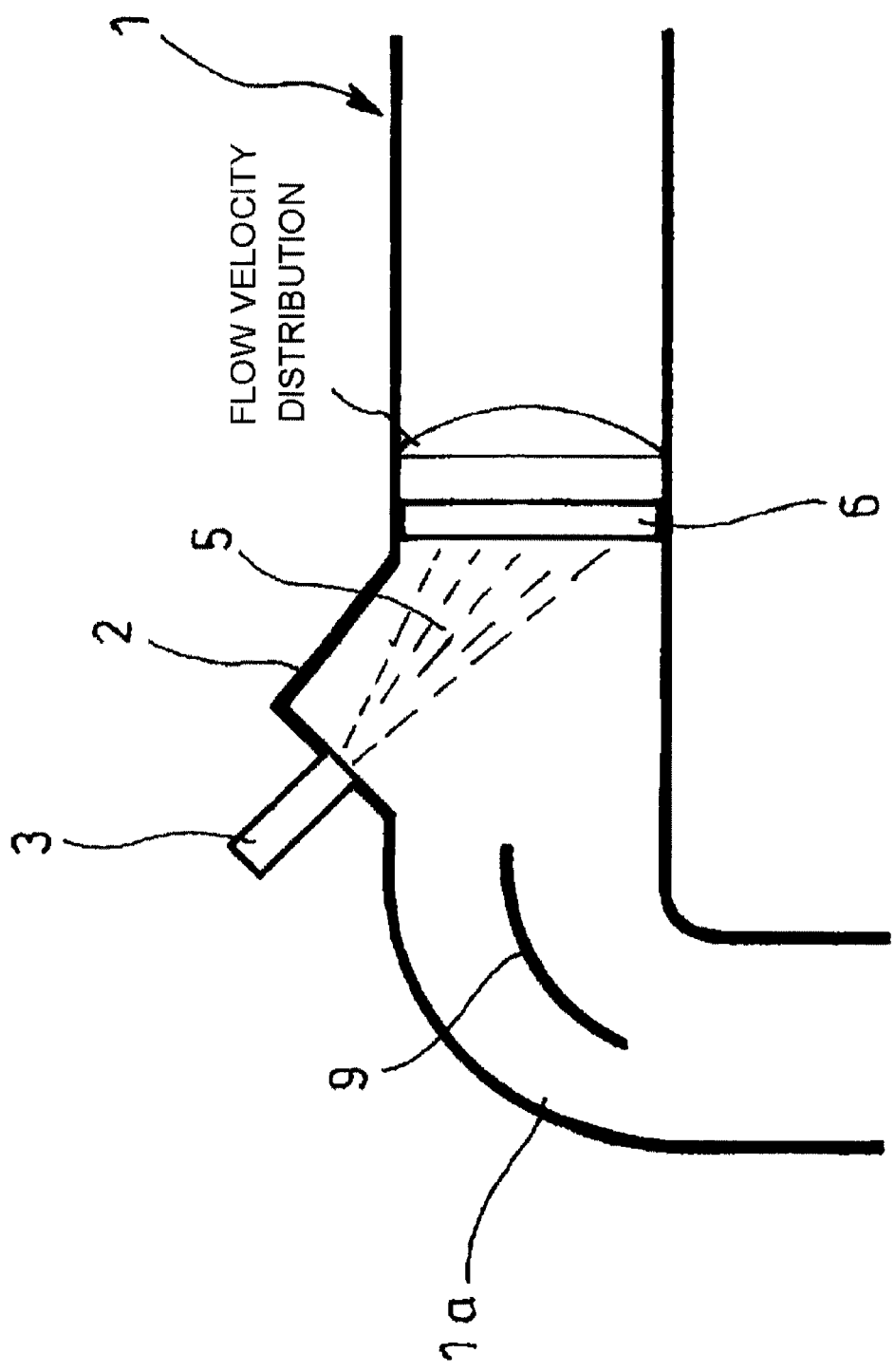
FIG. 7 is a schematic view showing a fourth embodiment of the invention.

FIG. 7 shows a fourth embodiment of the invention in which a baffle plate 9 is arranged in the bend 1a to suppress any flow of the exhaust gas 4 toward outward of the bending direction and rectify any biased flow velocity distribution.

In this case, part of the flow of the exhaust gas 4 passing the bend 1a of the exhaust pipe 1 toward outward of the bending direction is forcedly guided by the baffle plate 9 toward centrally of the exhaust pipe 1, so that the tendency of the exhaust gas 4 flowing biasedly and in relatively much amount toward outward of the bending direction is remedied to rectify any biased flow distribution of the exhaust gas 4.

As mentioned in the above, in any of the second to fourth embodiments, any biased flow distribution of the exhaust gas 4 is remedied, which makes it further unlikely to form the urea water 5 along the inside wall of the exhaust pipe 1 due to the influence of the biased flow of the exhaust gas 4 and facilitates dispersion of the urea water 5 injected from the injector 3 into the exhaust gas 4, so that even if the injector 3 is arranged immediately after the bend 1a of the exhaust pipe 1, similarly to the previous first embodiment, the urea water 5 can be satisfactorily dispersed and can be uniformly sprayed to the mixer 6 to improve efficiency of conversion into ammonia while substantially suppressing adhesion of the urea water 5 not converted into ammonia and any substances produced in the course of the conversion onto the inside wall of the exhaust pipe 1 and resultant precipitation of substances derived from the urea water 5 and material corrosion due to highly corrosive intermediate products produced.

It is to be understood that a mixing structure according to the invention is not limited to the above embodiments and that various changes and modifications may be made without departing from the scope of the invention. For example, the selective reduction catalyst arranged downstream of the injector may be directed in any direction and may be combined with any other particulate filter and the like.

REFERENCE SIGNS LIST 1 exhaust pipe
1a bend
3 injector
4 exhaust gas
5 urea water
7 depression
8 depression
9 baffle plate
$D_e$ pipe diameter
$D_p$ pipe diameter

The invention claimed is:

1. An exhaust system for a combustion engine, comprising:
   an exhaust pipe for gases exhausted from the engine, the exhaust pipe comprising a bent portion, an upstream portion connected to the bent portion at an upstream end of the bent portion in a direction of flow of the gases exhausted from the engine, and a constant diameter downstream portion connected to the bent portion at a downstream end of the bent portion in the direction of flow of the gases exhausted from the engine,
   wherein the bent portion of the exhaust pipe has an increased diameter between the upstream end of the bent portion and the downstream end of the bent portion such that a pipe diameter of the constant diameter downstream portion of the exhaust pipe is larger than a pipe diameter of the upstream portion of the exhaust pipe, to reduce any unevenness in a pressure of the exhaust gas induced by the bent portion of the exhaust pipe; and
   a liquid injector provided in the constant diameter downstream portion of the exhaust pipe and oriented to inject a liquid into the constant diameter downstream portion of the exhaust pipe.

2. The exhaust system as claimed in claim 1 wherein the bent portion is curved, and a radially outward portion of the exhaust pipe at the bent portion is depressed relative to a radius of curvature of the radially outer surface of the bent portion, to suppress a flow of the exhaust gas toward the radially outward portion of the exhaust pipe and reduce any inequality in the flow velocity distribution.

3. The mixing structure as claimed in claim 1, further comprising a baffle plate arranged in the downstream portion, to suppress a flow of the exhaust gas toward a radially outward portion of the exhaust pipe and reduce any inequality in the flow velocity distribution.

4. The exhaust system as claimed in claim 2 wherein the depressed radially outward portion of the exhaust pipe at the bent portion is depressed in the shape of a chord of the curvature of the radially outer surface of the bent portion.

5. The mixing structure as claimed in claim 1, wherein the constant diameter downstream portion of the exhaust pipe is straight.

6. The mixing structure as claimed in claim 1, wherein the liquid injector is a urea water injector.

7. The mixing structure as claimed in claim 1, wherein the bent portion of the exhaust pipe has a progressively increasing diameter from the upstream end of the bent portion to the downstream end of the bent portion.

8. A mixing structure with an injector arranged immediately after a bend of an exhaust pipe, urea water being injected by said injector into said exhaust pipe for mixing,
   wherein a pipe diameter of the exhaust pipe downstream of said bend is large relative to a pipe diameter of the exhaust pipe upstream of said bend, and the exhaust pipes both upstream and downstream of the bend are interconnected via said bend having a progressively increasing diameter towards downstream,
   further comprising a mixer having thin grate plates with planar surfaces in a direction of a flow of exhaust gas being arranged in the exhaust pipe downstream of said injector such that the urea water can be sprayed to said mixer from the injector.

9. The mixing structure as claimed in claim 8 wherein an outward portion of the bend in a bending direction is formed with a depression which suppresses any flow of the exhaust gas toward outward of the bending direction to remedy any biased flow velocity distribution.

10. The mixing structure as claimed in claim 8 wherein a baffle plate is arranged in the bend to suppress any flow of the exhaust gas toward outward of the bending direction to remedy any biased flow velocity distribution.

* * * * *